United States Patent
Herszenhaut et al.

(10) Patent No.: US 12,050,170 B2
(45) Date of Patent: Jul. 30, 2024

(54) POOL SURFACE SLIPPERINESS DETECTION

(71) Applicant: Maytronics Ltd., Kibbutz Yizrael (IL)

(72) Inventors: Leo Herszenhaut, Haifa (IL); Gilad Goldenberg, Kfar-Saba (IL); Boaz Ben Dov, Moshav Ram-On (IL)

(73) Assignee: Maytronics Ltd., Kibbutz Yizrael (IL)

( * ) Notice: Subject to any disclaimer, the term of this patent is extended or adjusted under 35 U.S.C. 154(b) by 0 days.

(21) Appl. No.: 18/381,199

(22) Filed: Oct. 18, 2023

(65) Prior Publication Data

US 2024/0133798 A1    Apr. 25, 2024

(30) Foreign Application Priority Data

Oct. 18, 2022    (IL) ............................................ 297359

(51) Int. Cl.
| | | |
|---|---|---|
| *G01N 19/00* | (2006.01) | |
| *E04H 4/16* | (2006.01) | |
| *G01N 19/02* | (2006.01) | |
| *G05D 1/00* | (2006.01) | |
| *G05D 1/08* | (2006.01) | |

(52) U.S. Cl.
CPC ........... *G01N 19/02* (2013.01); *E04H 4/1654* (2013.01); *G05D 1/0891* (2013.01)

(58) Field of Classification Search
CPC ..... G01N 19/02; E04H 4/1654; G05D 1/0891
See application file for complete search history.

(56) References Cited

U.S. PATENT DOCUMENTS

| | | |
|---|---|---|
| 2003/0078717 A1 | 4/2003 | Kawasaki |
| 2015/0286194 A1* | 10/2015 | Michelon ............. G05D 1/0022 700/275 |
| 2016/0235270 A1 | 8/2016 | Santini |

(Continued)

FOREIGN PATENT DOCUMENTS

| | | |
|---|---|---|
| CN | 108814441 | 11/2018 |
| CN | 110522353 | 12/2019 |

(Continued)

OTHER PUBLICATIONS

Partovibakhsh "Slip Ratio Estimation and Control of Wheeled Mobile Robot on Different Terrains", IEEE (Year: 2015).*

(Continued)

*Primary Examiner* — Rachid Bendidi (57) ABSTRACT

A method of evaluating slipperiness of a floor surface of a water pool by inducing one or more rotation scans of a pool equipment unit by driving a power pulse to one or more electric motors configured to rotate the pool equipment unit deployed on a floor surface of a water pool and at least partially submerged in water of the water pool, accumulating power values of the power pulse while its level is above a motor operation threshold, accumulating values of angular velocity of the pool equipment unit measured starting after the power pulse drops below the threshold until the pool equipment unit stops rotating; computing work energy invested to rotate the pool equipment unit based on the power values and the angular velocity values; computing a slipperiness index of the floor surface based on the work energy; and initiating one or more actions according to the slipperiness index.

18 Claims, 4 Drawing Sheets

(56) References Cited

U.S. PATENT DOCUMENTS

| | | |
|---|---|---|
| 2017/0212523 A1* | 7/2017 | Witelson .............. E04H 4/1654 |
| 2017/0277177 A1 | 9/2017 | Witelson et al. |
| 2019/0101394 A1* | 4/2019 | van der Meijden . G01C 21/005 |
| 2019/0243379 A1 | 8/2019 | Attar et al. |
| 2020/0149304 A1 | 5/2020 | Witelson |
| 2020/0249690 A1 | 8/2020 | Regev et al. |
| 2021/0177226 A1 | 6/2021 | Burns et al. |

FOREIGN PATENT DOCUMENTS

| | | | |
|---|---|---|---|
| EP | 2005140 | 9/2018 | |
| EP | 3521532 | 8/2019 | |
| EP | 3521532 A1 * | 8/2019 | ........... E04H 4/1654 |
| KR | 10-2005-0015689 | 2/2005 | |
| WO | WO 2022/206967 | 10/2022 | |

OTHER PUBLICATIONS

Search Report Dated Mar. 13, 2023 From the Israel Patent Office Re. Application No. 297359. (4 Pages).
Examination Report Dated Nov. 23, 2023 From the Australian Government, IP Australia Re. Application No. 2023251456. (6 Pages).
Partovibakhsh et al. "Slip Ratio Estimation and Control of Wheeled Mobile Robot on Different Terrains", 2015 IEEE International Conference on Cyber Technology in Automation, Control, and Intelligent Systems (CYBER), pp. 566-571, 2015.
Supplementary European Search Report and the European Search Opinion Dated May 13, 2024 From the European Patent Office Re. Application No. 23204361.2. (9 Pages).
Examination Report Dated Jun. 14, 2024 From the Australian Government, IP Australia Re. Application No. 2023251456. (2 Pages).

* cited by examiner

POOL SURFACE SLIPPERINESS DETECTION

RELATED APPLICATION(S)

This application claims the benefit of priority of Israel Patent Application No. 297359 filed on Oct. 18, 2022, now Israel Patent No. 297359, the contents of which are all incorporated by reference as if fully set forth herein in their entirety.

BACKGROUND

The present invention, in some embodiments thereof, relates to evaluating slipperiness of water surfaces of water pools, and, more specifically, but not exclusively, to evaluating slipperiness of water surfaces of water pools based on rotation scans conducted by pool equipment units deployed in the water pools.

Ensuring high water quality, hygiene, cleanliness and purity in artificial water bodies such as, for example, swimming pools, reservoirs, fountains, and/or the like may be highly desired and typically essential primarily for safety, health and/or hygiene related concerns.

Many automated pool equipment units, systems, platforms and/or devices are therefore deployed to treat the water pools and/or their water. The efficiency, robustness, capabilities and/or performance of such automated pool equipment is constantly improving to better address the need for maintaining clean water pools with high quality water to increase user experience and possibly reduce health threats.

SUMMARY

According to a first aspect of the present invention there is provided a computer implemented method of evaluating slipperiness of a floor surface of a water pool, comprising using one or more processors to execute a computer program code for:
  Inducing one or more rotation scans of a pool equipment unit by driving a power pulse to one or more electric motors configured to rotate the pool equipment unit deployed on a floor surface of a water pool and at least partially submerged in water of the water pool.
  Accumulating power values of the power pulse while a level of the power pulse is above a motor operation threshold of the one or more electric motors.
  Accumulating values of angular velocity of the pool equipment unit measured starting after the power pulse drops below the motor operation threshold until the pool equipment unit stops rotating.
  Computing work energy invested to rotate the pool equipment unit based on the accumulated power values and the accumulated angular velocity values.
  Computing a slipperiness index of the floor surface based on the work energy.
  Initiating one or more actions according to the slipperiness index.

According to a second aspect of the present invention there is provided a system for evaluating slipperiness of a floor surface of a water pool, comprising a program store storing a code; and one or more processors coupled to the program store. The one or more processors are configured to execute the code, the code comprising:
  Code instructions to induce one or more rotation scans of a pool equipment unit by driving a power pulse to one or more electric motors configured to rotate the pool equipment unit deployed on a floor surface of a water pool and at least partially submerged in water of the water pool.
  Code instructions to accumulate power values of the power pulse while a level of the power pulse is above a motor operation threshold of the one or more electric motors.
  Code instructions to accumulate values of angular velocity of the pool equipment unit measured starting after the power pulse drops below the motor operation threshold until the pool equipment unit stops rotating.
  Code instructions to compute work energy invested to rotate the pool equipment unit based on the accumulated power values and the accumulated angular velocity values.
  Code instructions to compute a slipperiness index of the floor surface based on the work energy.
  Code instructions to initiate one or more actions according to the slipperiness index.

In a further implementation form of the first and second aspects, the power pulse is defined based on an estimation of power required by the one or more electric motors to cause the pool equipment unit to complete a certain rotation movement during the one or more rotation scans.

In a further implementation form of the first and second aspects, the work energy is computed by dividing a sum of the accumulated power values by a sum of the accumulated angular velocity values.

In a further implementation form of the first and second aspects, the work energy is adjusted to include an absolute value of a quotient of the division.

In a further implementation form of the first and second aspects, the work energy is computed provided that there is a minimum number of accumulated power values and accumulated angular velocity values.

In a further implementation form of the first and second aspects, the work energy is adjusted based on one or more parameters of the water of the water pool. The one or more parameters are members of a group comprising: viscosity, pH, temperature, chemical composition, and/or biological composition.

In a further implementation form of the first and second aspects, the work energy is adjusted based on one or more mechanical features of the pool equipment unit.

In a further implementation form of the first and second aspects, the work energy is adjusted to compensate for one or more cables extending from the pool equipment unit in case of a wired pool equipment unit.

In a further implementation form of the first and second aspects, the work energy is adjusted based on one or more structural features of the water pool.

In a further implementation form of the first and second aspects, the slipperiness index is computed provided that a standard deviation of the work energy does not exceed a work deviation threshold predefined empirically based on a plurality of past rotation scans.

In a further implementation form of the first and second aspects, the slipperiness index is expressed in a plurality of discrete values.

In an optional implementation form of the first and second aspects, the slipperiness index is computed based on a median of the work energy computed based on power values and angular velocity values measured and accumulated in a plurality of rotation scans.

In a further implementation form of the first and second aspects, one or more of the actions are initiated in case the slipperiness index exceeds a certain threshold.

In a further implementation form of the first and second aspects, the one or more actions are members of a group consisting of: transmitting one or more notifications, inducing one or more water treatment operations, and/or inducing one or more pool treatment operations.

In a further implementation form of the first and second aspects, the one or more electric motors are configured to rotate the pool equipment unit by operating advancing means of the pool equipment unit.

In a further implementation form of the first and second aspects, the one or more electric motors comprise one or more servomotors.

In a further implementation form of the first and second aspects, the advancing means comprise two or more tracks arranged at two opposite sides of the pool equipment unit and rotated by one or more driving wheels spun by the one or more electric motors.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to evaluating slipperiness of water surfaces of water pools, and, more specifically, but not exclusively, to evaluating slipperiness of water surfaces of water pools based on rotation scans conducted by pool equipment units deployed in the water pools.

According to some embodiments of the present invention, there are provided methods, systems and computer program products for evaluating slipperiness of floor surfaces of one or more bodies of water according to rotation information, in particular rotational distance measured for one or more pool equipment units deployed on the floor surface of the water pool and operated to rotate in one or more rotation scans.

The pool equipment units, for example, a pool robot, a pool cleaning robot, a pool maintenance robot, a water treatment system, and/or the like may be deployed on the floor surface of one or more bodies of water, in particular manmade (artificial) bodies of water rather, for example, a pool, a swimming pool, a water reservoir, a fountain and/or the like (designated water pool herein after).

In particular, the pool equipment units are mobile and rotatable units having advancing means, for example, tracks, wheels, a combination thereof, and/or the like and powered by one or more electric motors which may drive the advancing means to rotate the pool equipment unit. While the pool equipment unit may be completely and/or partially submerged in the water of the water pool, its advancing means are in contact with the floor surface of the water pool and/or with one or more materials, substances, and/or vegetation covering the floor surface.

The pool equipment unit may be therefore operated to conduct one or more rotation scans during which the pool equipment unit may be rotated by driving one or more power pulses to its electric motors configured to rotate the pool equipment unit.

The slipperiness of the floor surface of the water pool, for example, a slipperiness index may be evaluated based on of work, i.e., the (amount of) energy invested to displace the pool equipment unit, i.e., to rotate the pool equipment unit where the displacement is the rotational (circular) distance traveled by the pool equipment unit.

During each rotation scan, work energy is measured and computed for the pool equipment unit. The work expresses the energy invested to rotate the pool equipment unit such that its travels a certain circular distance. During each scan, two main data items are therefore measured and collected for the pool equipment unit. The first measured data is the amount of power driven to the electric motor(s) rotating the pool equipment unit. In addition, angular velocity of the pool equipment unit is measured which may express the rotational distance traveled by the pool equipment unit.

The electric motor(s) may typically have an operation threshold such that when driven with power which is below the operation threshold, they may not drive the advancing means of the pool equipment unit and thus not rotate it. Therefore, in order to accurately measure the power invested to rotate the pool equipment unit, during the rotation scan, the power of the power pulse(s) driven to the electric motor(s) is preferably measured and accumulated only while the level of the power pulse(s) is above the motor's operation threshold.

Moreover, in order to accurately compute the power coefficient during each rotation scan, the angular velocity data is measured starting from the point when the electric motor(s) no longer actively rotate the pool equipment unit which is thus rotated only by the inertial force induced by the prior operation of the electric motor(s). As such, the rotational distance traveled by the pool equipment unit while actively rotated by the electric motor(s) is not included in the computation thus reducing and potentially completely eliminating contribution of the active rotation by the motor(s) which by their active force may overcome resistance and/or counter forces, for example, friction, water resistance, and/or the like thus making it impossible to effectively compute, estimate and/or evaluate the slipperiness index of the floor surface.

The work energy computed during each rotation scan may be therefore computed based on the power values of the power pulse(s) driven to the electric motor(s) rotating the pool equipment unit while they are above the motor's operation threshold and the angular velocity values starting from the time the power pulse(s) drop below the motor's operation threshold and the electric motor(s) no longer actively rotate the pool equipment unit.

Optionally, the work energy may be computed provided that there is a minimum number of accumulated power values and accumulated angular velocity values to ensure that a sufficient number of power and angular velocity values are accumulated and used to compute the work coefficient.

Optionally, the work energy may be adjusted based on one or more parameters of the water of the water pool, for example, viscosity, pH (acidity, basicity), temperature, chemical composition (compounds in the water), biological composition (e.g., algae, fungus, seaweed, etc.), and/or the like which may affect the density of the water in the water pool and thus the water's resistance characteristics which in turn may influence the rotational movement of the pool equipment unit.

Optionally, the work energy may be adjusted based on one or more mechanical features of the pool equipment unit, for example, weight, size, brushes friction, and/or the like which may also affect the rotational movement of the pool equipment unit.

Optionally, the work energy may be adjusted to compensate for one or more cables extending from the pool equipment unit in case of a wired pool equipment unit, for example, a power cable, an air compression hose, a dirt disposal pipe, and/or the like which affect mobility of the pool equipment unit.

Optionally, the work energy may be adjusted based on one or more structural features of the water pool, for example, a slope of the floor surface, a texture of the floor surface, and/or the like which may affect the rotational movement of the pool equipment unit.

Optionally, a plurality of rotation scans may be done and the work energy may be computed during each rotation scan and aggregated to produce and aggregated work energy value, for example, an average, a median, and/or the like which may be used to compute the slipperiness index of the floor surface.

Moreover, an aggregated work energy value may be computed based on a plurality of work energy values computed during a plurality of rotation scans of the pool equipment unit rotated while deployed in a plurality of locations on the floor surface of the water pool. Also, an aggregated work energy value may be computed based on a plurality of work coefficients computed for a plurality of rotation scans conducted by a plurality of pool equipment units deployed on the floor surface.

The slipperiness index of the floor surface may be then computed, estimated, and/or evaluated based on the work energy computed during the rotation scan(s). The slipperiness index may be computed according to one or more methods, algorithms and/or formulations.

Optionally, the slipperiness index may be computed provided that a standard deviation ($\sigma$) of the computed work energy does not exceed a certain predefined work deviation threshold in order to ensure a sufficiently tight and/or uniform distribution of the work energy. The work deviation threshold may be predefined empirically to an arbitrary value, for example, 500, 600, 700 and/or the like based on experimentation conducted for a plurality of past scan rotations conducted by one or more pool equipment units in which the work energy and the deviation of the work energy are measured and computed.

The slipperiness index may be computed by manipulating (e.g., dividing, multiplying, etc.) the work energy according to a certain predefined variable learned and/or determined for floor surfaces of water pools, for example, during previous rotation scans. In another example, the slipperiness index may be evaluated by mapping the work energy to a value and/or a range of slipperiness indicative values learned and/or determined for floor surfaces of water pools, for example, during previous rotation scans.

However, the slipperiness index may be optionally mapped and/or expressed in one of a plurality of discrete values. For example, a binary mapping of the slipperiness index may be done according to a certain slipperiness factor learned and/or determined, manually and/or automatically, for floor surfaces of water pools. In such binary mapping, a "1" may indicate that the floor surface is slippery and a "0" may indicate that the floor surface is not slippery.

Evaluating and/or estimating the slipperiness of the floor surface of water pools based on rotation movement of pool equipment units may present significant benefits and advantages.

First, the slipperiness index computed for the water pool may be highly indicative of the type of the water pool and/or one or more of its parameters and/or characteristics in particular with respect to operation of pool equipment units deployed in the water pool. For example, type and/or number of cleaning brushes of a pool cleaning robot and/or another cleaning equipment unit deployed in the water pool may be selected based on the slipperiness index. In another example, one or more motion parameters of the pool equipment unit, for example, speed, acceleration and/or the like may be set, adjusted and/or adapted according to the slipperiness index since it may be highly indicative of traction the pool equipment unit (e.g., pool robot) may have on the floor surface. Adaption of the motion parameters of the pool equipment unit may be of even higher importance in case of slopes in the floor surface. In another example, decisions relating to type and/or operation mode of collision detection means of the pool equipment unit (e.g., wall detection, etc.) may be made based on the slipperiness index since the slipperiness of the floor surface may significantly impact the movement patterns and/or capabilities of the pool equipment unit.

Moreover, slipperiness of the floor surface of a water pool may be highly indicative of one or more conditions, composition, quality and/or sanitary of the water of the water pool. For example, a slippery floor surface may be a result of one or more materials and/or vegetation (e.g. algae, fungus, seaweed, soil, litter, etc.) growing and/or disposed on the floor surface which may degrade the water quality and may impose potential health threats, for example, in swimming pools, water reservoirs and/or the like. In another example, the slipperiness index may be highly indicative of a chemical composition of the water since different substances, agents and/or materials may have a different effect on the slipperiness of the floor surface.

Furthermore, computing and/or evaluating the slipperiness index based on work energy which is adjusted according to one or more parameters, attributes, and/or characteristics of the pool equipment unit, the water in the water pool and/or the water pool itself may yield a highly more accurate slipperiness index. This is because the mechanical features of the pool equipment unit which may be wired and/or wireless, the water composition, the structural features of the water pool and/or the like may be accounted and/or compensated thus significantly increasing accuracy, reliability and/or consistency of the slipperiness index evaluation.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
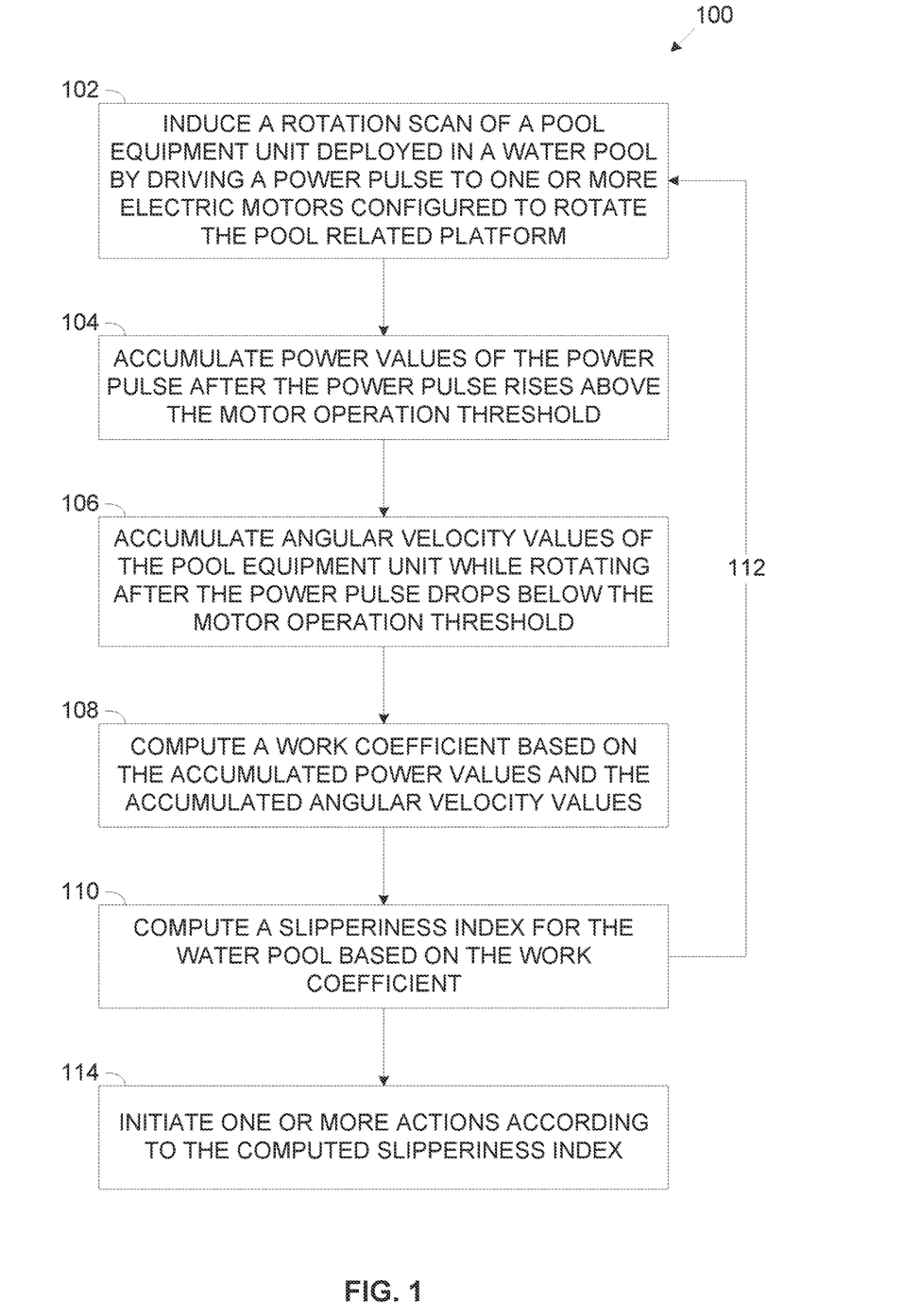
FIG. 1 is a flowchart of an exemplary process of evaluating slipperiness of a water pool floor surface based on a rotation scan of a pool equipment unit, according to some embodiments of the present invention.

Referring now to the drawings, FIG. 1 is a flowchart of an exemplary process of evaluating slipperiness of a water pool floor surface based on a rotation scan of a pool equipment unit, according to some embodiments of the present invention.

An exemplary process 100 may be executed to evaluate slipperiness of a floor surface of one or more bodies of water based on rotation information measured for one or more pool equipment units deployed on the floor surface and operated to rotate in one or more rotation scans.

Figure 2:
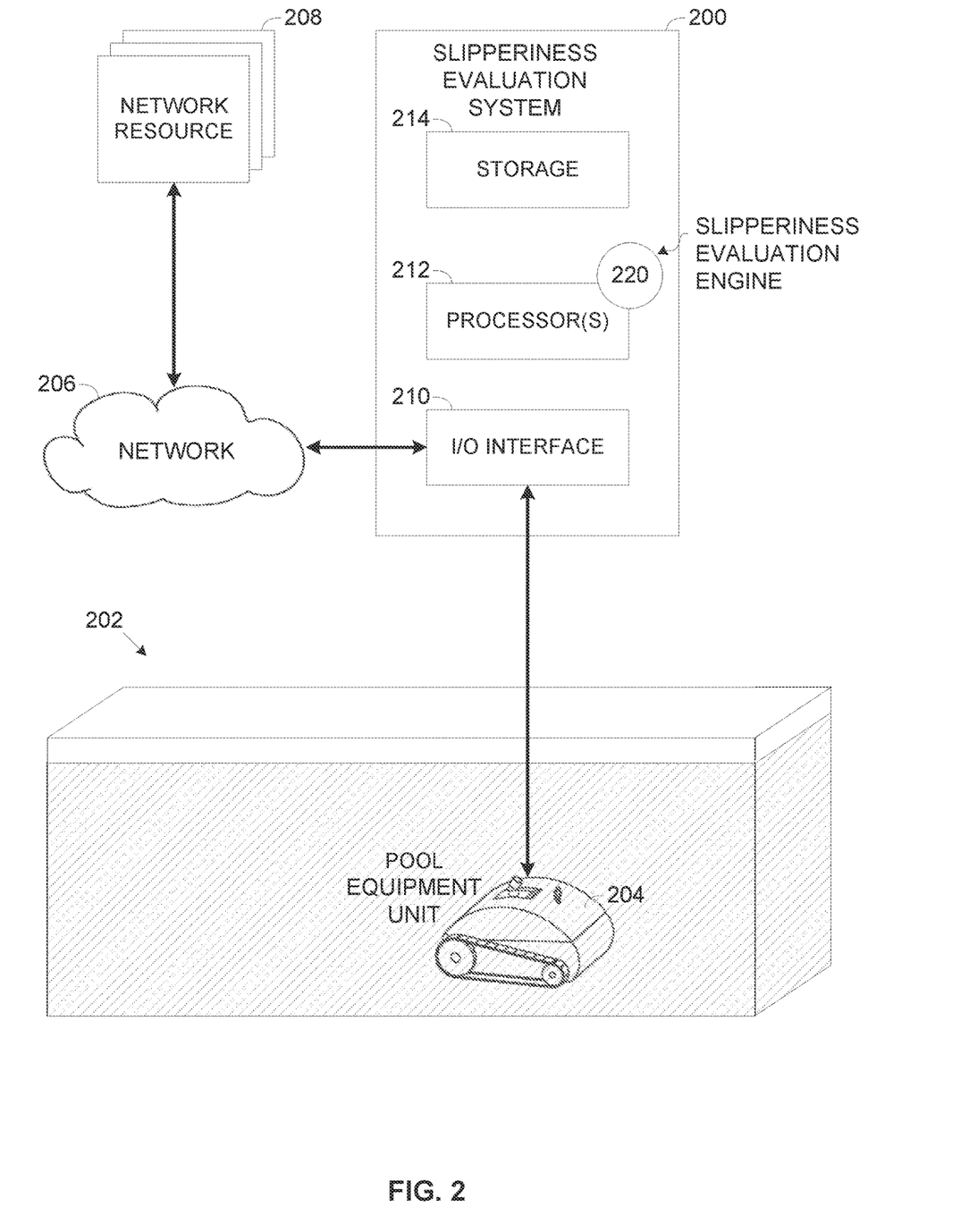
FIG. 2 is a schematic illustration of an exemplary system for evaluating slipperiness of a water pool floor surface based on a rotation scan of a pool equipment unit, according to some embodiments of the present invention.

Reference is also made to FIG. 2, which is a schematic illustration of an exemplary system for evaluating slipperiness of a water pool floor surface based on a rotation scan of a pool equipment unit, according to some embodiments of the present invention.

An exemplary slipperiness evaluation system 200 may be deployed to evaluate slipperiness of one or more surfaces, in particular floor surfaces of one or more bodies of water 202, specifically manmade (artificial) bodies of water rather such as, for example, a pool, a swimming pool, a water reservoir, a fountain and/or the like designated water pool 202 herein after.

Evaluation of the floor surface slipperiness may be evaluated based on rotation parameters measured for one or more pool equipment units 204, in particular mobile and rotatable pool equipment units 204, for example, a pool robot, a pool cleaning robot, a pool maintenance robot, a water treatment system, and/or the like which are deployed on the floor surface of the water pool 202.

The pool equipment units 204 may comprise one or more electric motors, for example, a self-commutated motor, an external commutated motor, a synchronous motor, an asynchronous motor and/or the like. Optionally, one or more of the electric motors of the pool equipment units 204 may comprise one or more servomotors which are positioned controlled with a feedback system as known in the art. In another example, one or more of the electric motors of the pool equipment units 204 may comprise one or more step motors which divides a full rotation into a number of equal steps. As known in the art, the electric motors may be operated by driving them with power, for example, voltage, current and/or the like, typically using Pulse Width Modulation (PWM).

One or more of the electric motors of the pool equipment units 204 may be configured to rotate the pool equipment units 204 around its center axis, for example, z axis which may typically be substantially perpendicular to the floor surface of the water pool 202. For example, one or more of the electric motors may be configured to rotate the pool equipment unit 204 by operating advancing means of the pool equipment unit 204, for example, wheels, tracks, a combination thereof, and/or the like.

In some embodiments the advancing means of one or more of the pool equipment units 204 may comprise two or more tracks arranged at two opposite sides of the pool equipment unit 204 which may be rotated by one or more driving wheels spun by one or more of the electric motor of the pool equipment units 204. In such case, one or more motors of the pool equipment units 204 may be operated, for example, to spin the driving wheel of only one of the tracks thus causing the pool equipment units 204 to rotate around its z axis. In another example, one or more motors of the pool equipment units 204 may be operated to spin the driving wheel of one of the tracks in one direction while spinning the driving wheel of the other tracks in the opposite direction thus also causing the pool equipment units 204 to rotate around its z axis.

Each pool equipment unit 204 may further comprise one or more sensors, devices, and/or units for capturing, measuring and/or collecting sensory data relating to rotational movement of the pool equipment unit 204. The rotation information, for example, angular velocity, acceleration, velocity, Revolutions Per Minute (RPM), and/or the like may be captured, measured, and/or monitored by one or more motion sensors and/or devices deployed in the pool equipment unit 204, for example, a gyroscope, a magnetometer, an Inertial Measurement Units (IMU), a Hall effect sensor, and/or the like. The motion sensors may further include one or more imaging sensors, for example, a camera, a video camera, and/or the like which may capture images of the pool equipment unit 204 from which the rotation information may be derived.

Each pool equipment unit 204 deployed in a water pool 202 may be at least partially submerged in the water of the water pool 202. For example, one or more pool related equipment 204 may be fully submerged in the water of one or more of the water pools 202 such these pool equipment units 204 are entirely under water. In another example, one or more pool equipment units 204 may be partially submerged in the water of one or more of the water pools 202 such part of these pool equipment units 204, specifically the advancing means are submerged in water while other parts protrude out of the water.

The slipperiness evaluation system 200, for example, a controller, a computer, a server, a computing node, a cluster of computing nodes and/or the like may include an Input/Output (I/O) interface 210, a processor(s) 212, and a storage 214 for storing data and/or computer program code (program store).

The I/O interface 210 may include one or more wired and/or wireless I/O interfaces, ports and/or interconnections, for example, a Universal Serial Bus (USB) port, a serial port, a Bluetooth (BT) interface, a Radio Frequency (RF) interface, Wireless Local Area Network (WLAN, e.g. Wi-Fi), and/or the like. Via the I/O interface 210, the slipperiness evaluation system 200 may communicate with one or more external devices. For example, via the I/O interface 210, the slipperiness evaluation system 200 may control one or more pool equipment units 204 deployed on the floor surface of one or more water pools 202. Via the I/O interface 210, the slipperiness evaluation system 200 may further receive information relating to power driven to the electric motor(s) of the pool equipment unit(s) 204 and/or to rotation movement of the pool equipment unit(s) 204.

The I/O interface 210 may further include one or more wired and/or wireless network interfaces for connecting to a network 206 comprising one or more wired and/or wireless networks, for example, a Local Area Network (LAN), a WLAN (e.g. Wi-Fi), a Wide Area Network (WAN), a Metropolitan Area Network (MAN), a cellular network, the internet and/or the like. Via the I/O interface 210, the slipperiness evaluation system 200 may communicate over the network 206 with one or more remote network resources 208, for example, a server, a storage server, a cloud service, and/or the like. As such, in case one or more of the pool equipment units 204 are connected to the network 206, the slipperiness evaluation system 200 may communicate with such pool equipment units 204 via the network 206.

Optionally, one or more of the pool equipment units 204 may be controlled, operated and/or commanded by one or more control systems independent of the slipperiness evaluation system 200. Such control systems may operate the pool equipment units 204, for example, control power driven to one or more of electric motors of the pool equipment unit(s) 204, collect data relating to rotation movement of the pool equipment unit(s) 204, and/or the like. In such case, the slipperiness evaluation system 200 may communicate with such control systems via the I/O interface 210, optionally over the network 206.

The processor(s) 212, homogenous or heterogeneous, may include one or more processing nodes arranged for parallel processing, as clusters and/or as one or more multi core processor(s).

The storage 214 may include one or more non-transitory memory devices, either persistent non-volatile devices, for example, a ROM, a Flash array, a hard drive, an SSD, and/or the like as well as one or more volatile devices, for example, a RAM device, a cache memory and/or the like. The storage 214 may further comprise one or more local and/or remote network storage resources, for example, a storage server, a Network Attached Storage (NAS), a network drive, a cloud storage service and/or the like accessible via the network 206.

The processor(s) 212 may execute one or more software modules, for example, a process, a script, an application, an agent, a utility, a tool, an Operating System (OS), a service, a plug-in, an add-on and/or the like each comprising a plurality of program instructions stored in a non-transitory medium (program store) such as the storage 214 and executed by one or more processors such as the processor(s) 212.

Optionally, the processor(s) 212 may include, utilize and/or apply one or more hardware elements available in the slipperiness evaluation system 200, for example, a circuit, a component, an Integrated Circuit (IC), an ASIC, an FPGA, a Digital Signals Processor (DSP), a Graphic Processing Unit (GPU), and/or the like.

The processor(s) 212 may therefore execute one or more functional modules utilized by one or more software modules, one or more of the hardware modules and/or a combination thereof. For example, the processor(s) 212 may execute a slipperiness evaluation engine 220 configured to execute the process 100 for evaluating slipperiness of the floor surface of one or more water pools 202. It should be noted that the steps of the process 100 executed by the slipperiness evaluation system 200, specifically by the slipperiness evaluation engine 220 may be executed by any of one or more processors of the processor(s) 212 such that any one of the processors of the processor(s) 212 may execute the process 100 and/or part thereof or optionally not participate in execution of the process 100.

Optionally, the slipperiness evaluation system 200, specifically, the slipperiness evaluation engine 220 may be utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2), IBM Cloud, and/or the like.

In some embodiments, the slipperiness evaluation system 200 may be integrated in one or more water cleaning systems and/or equipment, for example, a cleaning system, a purifying system, and/or the like configured to automatically clean the water in one or more water pools 202. In such embodiments, the water cleaning system may execute the slipperiness evaluation engine 220 executing the process 100.

Optionally, the slipperiness evaluation system 200 may be integrated with one or more pool equipment units 204, for example, a pool robot (cleaning robot, maintenance robot, etc.), such that each such pool equipment unit 204 may execute an instance of the slipperiness evaluation engine 220.

For brevity, the process 100 is presented and described for evaluating slipperiness in a single water pool 202 based rotation movement of a single pool equipment unit 204. This, however, should not be construed as limiting since the process 100 may be easily expanded and/or extended for evaluating slipperiness in a plurality of water pools 202. Moreover, as may become obvious to a person skilled in the art, the process 100 may be conducted and/or enhanced by evaluating slipperiness of the floor surface of one or more water pools 202 based on rotation movement of multiple pool equipment units 204 deployed on the floor of these water pools 202.

Moreover, during the process 100, the slipperiness evaluation engine 220 may communicate with one or more resources of the pool equipment unit 204, for example, a device, a controller, a motor, a circuit, a module, a sensor and/or the like. For example, the slipperiness evaluation engine 220 may operate one or more electric motors of the slipperiness evaluation engine 220. In another example, the slipperiness evaluation engine 220 may collect data, for example, information relating to power pulses driven to operate one or more electric motors of the pool equipment unit 204, angular velocity information captured by one or more sensors of the pool equipment unit 204, and/or the like captured by one or more sensors, controllers and/or other devices of the pool equipment unit 204.

As described herein before, the slipperiness evaluation system 200 and hence the slipperiness evaluation engine 220 may be independent of the pool equipment unit 204 or they may be integrated in one or more remote control systems configured to control movement of the pool equipment unit 204 or even integrated with the pool equipment unit 204 itself. The slipperiness evaluation engine 220 may be therefore configured to communicate with the resources of the pool equipment unit 204 according to its deployment, configuration or implementation.

As shown at 102, the process 100 starts with the slipperiness evaluation engine 220 inducing a rotation scan of a pool equipment unit 204 deployed on a floor surface of a water pool 202 and at least partially submerged in the water of the water pool 202.

The slipperiness evaluation engine 220 may induce the rotation scan by driving a power pulse to one or more electric motors of the pool equipment unit 204 operated, controlled and/or configured to rotate the pool equipment unit 204 as described herein before.

As stated herein before, the exact method for driving the power pulse to the electric motor(s) depends on the deployment mode of the slipperiness evaluation engine 220. For example, in case the slipperiness evaluation engine 220 is executed by one or more controllers of the pool equipment unit 204, the slipperiness evaluation engine 220 may directly control one or more power circuits of the pool equipment unit 204 to drive the power pulse to the electric motor(s) of the pool equipment unit 204. In another example, the slipperiness evaluation engine 220 may be executed remotely from the pool equipment unit 204, for example, by an independent slipperiness evaluation system 200 and/or by a remote control system of the pool equipment unit 204 which are in communication with the pool equipment unit 204 via one or more communication channels. In such case, the slipperiness evaluation engine 220 may communicate with the controller of the pool equipment unit 204 and remotely instruct it to control one or more power circuits of the pool equipment unit 204 to drive the power pulse to the electric motor(s) of the pool equipment unit 204.

One or more characteristics of the power pulse driven by the slipperiness evaluation engine 220 to the electric motor(s) of the pool equipment unit 204, for example, a voltage, a current, a duration, a shape, and/or the like, may be defined based on an estimation of power required by the electric motor(s) to cause the pool equipment unit to complete a certain rotation movement during the rotation scan, for example, a 1800 rotation, a 3600 rotation, a 7200 rotation and/or the like.

The power pulse may be configured according to the estimation since the actual power may vary between water pools 202 depending on one or more parameters, attributes and/or characteristics of each water pool 202 which may influence and/or affect the rotation movement of the pool equipment unit 204. Such parameters may comprise one or more parameters of the water in the water pool 202, for example, for example, viscosity, acidity, (chemical) composition and/or the like. In another example, these parameters may comprise one or more mechanical features of the floor surface of the water pool 202, for example, a slope, a texture, slipperiness and/or the like.

The estimation of the power required to rotate the pool equipment unit 204 may be based, for example, on one or more previous rotation scans conducted in one or more water pools 202. In another example, the estimation of the required power may be based on average parameters, attributes and/or characteristics of water pools 202 observed and/or measured for a plurality of water pools 202. In another example, the estimation may be based on analytical computation.

As shown at 104, the slipperiness evaluation engine 220 may accumulate power information relating to the power pulse driven to the electric motor(s) of the pool equipment unit 204 in order to rotate the pool equipment unit 204 during the rotation scan. The power information may comprise, for example, power values which may be expressed and/or or derived from one or more values, for example, power values, voltage values, current values and/or the like.

As described herein before, collection of the power values by the slipperiness evaluation engine 220 may depend on its deployment mode. For example, in case the slipperiness evaluation engine 220 is executed by a controller of the pool equipment unit 204, the slipperiness evaluation engine 220 may directly collect the power values driven by the power circuit(s) of the pool equipment unit 204 to the electric motor(s). In another example, in case the slipperiness evaluation engine 220 is executed remotely from the pool equipment unit 204, the slipperiness evaluation engine 220 may communicate with the controller(s) of the pool equipment unit 204 via the communication channel(s) to receive the power values collected by the local controller(s) of the pool equipment unit 204.

The slipperiness evaluation engine 220 may collect the power values during and/or after the rotation scan and accumulate the collected power values by storing them in one or more memory resources, for example, the storage 214. The slipperiness evaluation engine 220 may accumulate the collected power values in one or more memory structures and/or records, for example, a buffer, a list, a table, a file and/or the like.

In particular, the slipperiness evaluation engine 220 may collect the power values driven to the electric motor(s) during the rotation scan after the power pulse(s) rises above a motor operation threshold of the electric motor(s), also known in the art as Motor Dead Zone (MDZ). Power driven to the electric motor(s) which is below the motor operation threshold may not cause the electric motor(s) to induce rotation of the pool equipment unit 204. Only after the level of power driven to the electric motor(s) exceeds (rises above) the motor operation threshold, the electric motor(s) may start rotating the pool equipment unit 204.

The slipperiness evaluation engine 220 may therefore collect the power values driven to the electric motor(s) while the level of the power pulse is above the motor operation threshold since these power values may express the power invested to rotate the pool equipment unit 204 during the rotation scan.

As shown at 106, the slipperiness evaluation engine 220 may accumulate information relating to the rotation movement of the pool equipment unit 204 during the rotation scan, for example, values of angular velocity captured by one or more motion sensors and/or devices deployed in the pool equipment unit 204, for example, a gyroscope, a magnetometer, an IMU, a Hall effect sensor, an imaging sensor, and/or the like.

As described for the power values, collection of the rotation information, for example, angular velocity values by the slipperiness evaluation engine 220 may depend on its deployment mode. For example, in case the slipperiness evaluation engine 220 is executed by a controller of the pool equipment unit 204, the slipperiness evaluation engine 220 may directly communicate with the motion sensors deployed in the pool equipment unit 204 to collect the angular velocity values. In another example, in case the slipperiness evaluation engine 220 is executed remotely from the pool equipment unit 204, the slipperiness evaluation engine 220 may communicate with the controller(s) of the pool equipment unit 204 via the communication channel(s) established with the pool equipment unit 204 to receive the angular velocity values collected by the local controller(s) from the motion sensor(s) and/or device(s) deployed in the pool equipment unit 204.

In particular, the slipperiness evaluation engine 220 may collect the angular velocity values after the level of the power pulse drops below the motor operation threshold until the pool equipment unit 204 stops rotating. As such, the collected angular velocity values may reflect the rotation movement of the pool equipment unit 204 induced by the inertial force built during the prior operation of the electric motor(s) and does not include rotation data relating to rotation of the pool equipment unit 204 while actively rotated by the electric motor(s).

This may be done in order to avoid measurements of the rotational distance traveled by the pool equipment unit 204 while actively rotated by the electric motor(s) which by their active force may overcome resistance and/or counter forces, for example, friction, water resistance, and/or the like thus making it impossible to effectively measure such counter forces. After the level of the power pulse drops below the motor operation threshold, the pool equipment unit 204 may continue rotating due to the inertial movement until it stops rotating due to the resistance and/or counter forces.

The slipperiness evaluation engine 220 may therefore collect the angular velocity values only during the intertidal rotation movement of the pool equipment unit 204, i.e., starting after the power pulse drops below the motor operation threshold until the pool equipment unit 204 stops rotating and comes to a still state.

Figure 3:
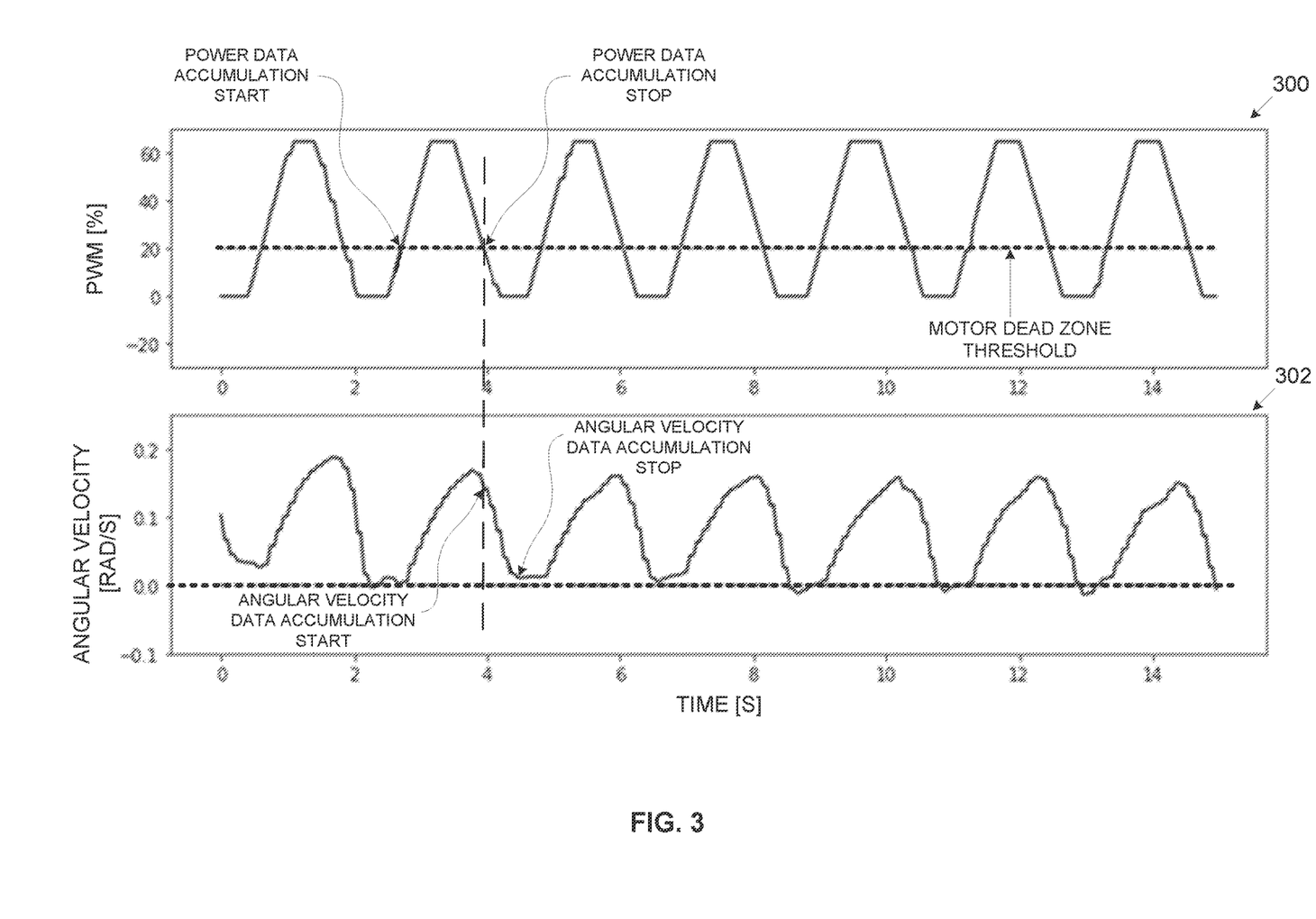
FIG. 3 illustrates graph charts of power driven to operate an electric motor to rotate a pool equipment unit and angular velocity of the pool equipment unit which are used for evaluating slipperiness of a water pool floor surface, according to some embodiments of the present invention.

Reference is now made to FIG. 3, which illustrates graph charts of power driven to operate an electric motor to rotate a pool equipment unit and angular velocity of the pool equipment unit which are used for evaluating slipperiness of a water pool floor surface, according to some embodiments of the present invention.

A graph chart 300 illustrates a PWM sequence comprising a plurality of power pulses (pulse train) driven over time to an electric motor configured to rotate a pool equipment unit such as the pool equipment unit 204 deployed on a floor surface of a water pool such as the water pool 202 to induce a plurality of rotation scans of the pool equipment unit 204 in order to evaluate and/or estimate slipperiness of the floor surface. The power pulses may be expressed by one or more power variables and corresponding units, for example, voltage expressed by Volts.

Each power pulse in the PWM sequence may correspond to a respective rotation scan of the pool equipment unit 204.

A slipperiness evaluation engine such as the slipperiness evaluation engine 220 may accumulate power values of each power pulse starting from the time the level of the power pulse is above the motor operation threshold (MDZ), designated "Power Data Accumulation Start" in graph 300, until the level of the power pulse drops below the motor operation threshold (MDZ) which is designated "Power Data Accumulation Stop".

A graph chart 302 illustrates an angular velocity of the pool equipment unit 204 over time while rotated by the electric motor driven with the PWM sequence of power pulses where the angular velocity may be expressed by radians per second. As seen, for each rotation scan (power pulse) the slipperiness evaluation engine 220 may accumulate angular velocity values starting from the time that the electric motor stops to actively rotate the pool equipment unit 204, i.e., when the level of the power pulse drops below the motor operation threshold (MDZ), designated "Angular Velocity Data Accumulation Start" in graph 300, until the pool equipment unit 204 stops rotating, i.e., when the angular velocity is practically "0", which is designated "Angular Velocity Data Accumulation Stop". Optionally, the slipperiness evaluation engine 220 may accumulate the angular velocity values for a fixed time interval starting from the time that the electric motor stops to actively rotate the pool equipment unit 204. The fixed time interval may be set, selected and/or predefined such that it does not extended beyond the time point at which the pool equipment unit 204 stops rotating.

Reference is made once again to FIG. 1.

As shown at 108, based on the accumulated power values and the accumulated angular velocity values, the slipperiness evaluation engine 220 may compute work energy invested to rotate the pool equipment unit 204 designated herein after work coefficient $W_C$.

As known in the art, work is the (amount of) energy transferred to or from an object via the application of force along a displacement. The work is therefore a sum of the overall power invested (applied, consumed, used, etc.) to displace the object. In this case, the work is the overall power invested to rotate the pool equipment unit 204 which thus travels a circular distance. The work coefficient $W_C$ may therefore express the amount of work, reflected by the overall power (power values) invested to displace the pool equipment unit 204 in rotational movement such that the pool equipment unit 204 travels a certain circular distance measured by the angular velocity values.

The slipperiness evaluation engine 220 may apply one or more methods, algorithms and/or computations to compute the work coefficient $W_C$. For example, the slipperiness evaluation engine 220 may compute the work coefficient $W_C$ by dividing a sum of the accumulated power values by a sum of the accumulated angular velocity values. Moreover, the slipperiness evaluation engine 220 may adjust the work coefficient $W_C$ to include an absolute value of a quotient of the division of the sum of the accumulated power values by the sum of the accumulated angular velocity values as formulated in equation 1 below.

$$W_c = \left| \frac{\sum P_{Scan}}{\sum \omega_{Scan}} \right| \qquad \text{Equation 1}$$

Where $P_{scan}$ are the power values driven to the electric motor(s) during the rotation scan in order to rotate the pool equipment unit 204 which are accumulated as described in step 104 of the process 100 and $\omega_{scan}$ are the angular velocity values expressing the rotation movement of the pool equipment unit 204 during the rotation scan which are accumulated as described in step 106 of the process 100.

Optionally, the slipperiness evaluation engine 220 may compute the work coefficient $W_C$ provided that there is a minimum number of accumulated power values and accumulated angular velocity values, for example, 10, 15, 20 and/or the like. This may be done to ensure that a sufficient number of power and angular velocity values are accumulated and used to compute the work coefficient $W_C$ in order to yield work coefficient $W_C$ a reliable, accurate and/or substantial work coefficient $W_C$.

Optionally, the slipperiness evaluation engine 220 may adjust the work coefficient $W_C$ based on one or more parameters of the water of the water pool 202, for example, viscosity, pH (acidity, basicity), temperature, chemical composition (compounds in the water), biological composition (e.g., algae, fungus, seaweed, etc.), and/or the like. These water parameters may affect the density of the water in the water pool 202 and thus the water's resistance characteristics which may influence the rotational movement of the pool equipment unit 204. The slipperiness evaluation engine 220 may therefore adjust the work coefficient $W_C$ to compensate for the increased or reduced resistance of the water in the water pool 202 according to parameter(s) of the water identified and/or learned using one or more methods and/or techniques know in the art, for example, visual analysis, chemical analysis, learned during previous scans, analytical computation, and/or the like.

Optionally, the slipperiness evaluation engine 220 may adjust the work coefficient $W_C$ based on one or more mechanical features of the pool equipment unit 204, for example, weight, size, brushes friction, and/or the like which may affect the rotational movement of the pool equipment unit 204. For example, a large pool equipment unit 204 may have a large surface area which is in contact with the water of the water pool 202 and is thus subject to larger resistance force of the water compared to a smaller pool equipment unit 204 having a smaller surface area. More work may be therefore invested in the larger pool equipment unit 204 compared to the smaller pool equipment unit 204 to cause them to travel the same rotational distance and the slipperiness evaluation engine 220 may adjust the work coefficient $W_C$ accordingly. In another example, more work may be invested in a heavy pool equipment unit 204 compared to a lighter pool equipment unit 204 to cause them to travel the same rotational distance. In another example, a first pool equipment unit 204, for example, a pool cleaning robot may comprise larger and/or more cleaning brushes than a second pool equipment unit 204 which may significantly increase friction of the first pool equipment unit 204 with the floor surface of the water pool 202 compared to friction of the second pool equipment unit 204. More work may be therefore invested in the higher friction first pool equipment unit 204 compared to the lower friction second pool equipment unit 204 to cause them to travel the same rotational distance and the slipperiness evaluation engine 220 may adjust the work coefficient $W_C$ accordingly.

Optionally, the slipperiness evaluation engine 220 may adjust the work coefficient $W_C$ to compensate for one or more cables extending from the pool equipment unit 204 in case of a wired pool equipment unit 204, for example, a power cable, an air compression hose, a dirt disposal pipe, and/or the like. A cable extending from the pool equipment unit 204 may obviously affect mobility of the pool equipment unit 204 which may affect, for example, increase the force and/or power required to rotate it. The slipperiness evaluation engine 220 may therefore adjust the work coefficient $W_C$ to compensate for such cable(s). The impact and/or effect of the extending cable(s), for example, in terms of force and/or power may be identified and/or learned using one or more methods and/or techniques know in the art, for example, determined based on analytical computation, learned during previous scans, and/or the like.

Optionally, the slipperiness evaluation engine 220 may adjust the work coefficient $W_C$ based on one or more structural features of the water pool 202, for example, a slope of the floor surface, a texture of the floor surface, and/or the like which may affect the rotational movement of the pool equipment unit 204.

For example, rotating the pool equipment unit 204 deployed on a floor surface of the water pool 202 which has a slope or an inclination may require a different amount of work than the work required to rotate the same pool equipment unit 204 on a flat floor surface. The slipperiness evaluation engine 220 may therefore adjust the work coefficient $W_C$ accordingly to compensate for a slope of the floor surface which may be identified based on analysis of sensory data captured by one or more sensors, for example, a gyroscope, an imaging sensor, and/or the like. In another example, a floor surface of a first water pool 202 may have a crude texture which may increase friction and thus traction of the pool equipment unit 204 deployed on the floor compared to traction of the same pool equipment unit 204 deployed on a floor surface of a second water pool 202 which may have a significantly smoother texture. The friction and/or traction may affect the rotational movement of the pool equipment unit 204, for example, more work may be required to rotate the pool equipment unit 204 on a lower traction floor surface compared to the work required to rotate the same pool equipment unit 204 on a higher traction floor surface and the slipperiness evaluation engine 220 may therefore adjust the work coefficient $W_C$ accordingly.

As shown at 110, the slipperiness evaluation engine 220 may compute a slipperiness index $S_i$ for the floor surface of the water pool 202 based on the work energy, expressed by the work coefficient $W_C$, computed for the rotation scan of the pool equipment unit 204.

Optionally, the slipperiness evaluation engine 220 may compute the slipperiness index $S_i$ provided that a standard deviation ($\sigma$) of the work coefficient $W_C$ does not exceed a predefined work deviation threshold $T_{\sigma(W)}$ in order to ensure a sufficiently tight and/or uniform distribution of the work energy. The work deviation threshold $T_{\sigma(W)}$ may be predefined, set and/or computed empirically to an arbitrary value, for example, 500, 600, 700 and/or the like based on empiric data collected during experiments in which a plurality of past scan rotations were conducted by one or more pool equipment units and the work energy and its deviation are measured and computed. This means that the slipperiness evaluation engine 220 may compute the slipperiness index $S_i$ in case $\sigma(W_C) < T_{\sigma(W)}$ while in case $\sigma(W_C) > T_{\sigma(W)}$ the slipperiness evaluation engine 220 does not compute the slipperiness index $S_i$.

The slipperiness evaluation engine 220 may apply one or more computations and/or formulations to compute the slipperiness index $S_i$.

For example, the slipperiness evaluation engine 220 may compute the slipperiness index $S_i$ by manipulating (e.g., dividing, multiplying, etc.) the work coefficient $W_C$ computed for the rotation scan according to a certain predefined variable learned and/or determined for floor surfaces of water pools 202, for example, during a plurality of previous rotation scans. In another example, the slipperiness evaluation engine 220 may compute the slipperiness index $S_i$ by mapping the work coefficient $W_C$ computed for the rotation scan to a value and/or a range of slipperiness indicative values learned and/or determined for floor surfaces of water pools 202, for example, during a plurality of previous rotation scans.

In another example, the slipperiness evaluation engine 220 may express the slipperiness index $S_i$ in one of a plurality of discrete values. For example, the slipperiness evaluation engine 220 may apply binary values according to a certain slipperiness factor $S_F$ learned and/or determined, manually and/or automatically, for a plurality of floor surfaces of water pools 202, for example, during a plurality of previous rotation scans. In such binary formulation, a value of "0" may indicate that the floor surface of the water pool is not slippery and a value of "1" may indicate that the floor surface of the water pool is slippery. The slipperiness evaluation engine 220 may further apply some conditions to exclude abnormal conditions, for example, another value, for example, "−2" may be assigned to the slipperiness index $S_i$ of the water pool 202 in case the standard deviation of the work coefficient $W_C$ exceeds the predefined work deviation threshold $T_{\sigma(W)}$, i.e., in case $\sigma(W_C) > T_{\sigma(W)}$.

Optionally, as Shown in 112, the slipperiness evaluation engine 220 may induce one or more additional rotation scans of the pool equipment unit 204 in the water pool 202 and repeat steps 102-110 for each additional rotation scan.

The slipperiness evaluation engine 220 may therefore compute the slipperiness index $S_i$ of the water pool 202 based on a plurality of work coefficients $W_C$ each computed during a respective one of a plurality of rotation scans of the pool equipment unit 204 in the water pool 202, for example, 3, 5, 10 rotation scans and/or the like.

For example, the slipperiness evaluation engine 220 may compute the slipperiness index $S_i$ based on an aggregated work coefficient aggregating the plurality of work coefficients $W_C$ computed for a plurality of rotation scans, for example, an average work coefficient, a median work coefficient, and/or the like.

For example, in case of a median work coefficient, the slipperiness evaluation engine 220 may compute a median $(W_C)$ of a plurality of work coefficients $W_C$ computed for a respective one of the plurality of rotation scans based on power values and angular velocity values measured and accumulated during the respective rotation scan. The slipperiness evaluation engine 220 may then compute the slipperiness index $S_i$ based on the median work coefficient median$(W_C)$.

For example, slipperiness evaluation engine 220 may expand the binary formulation to define a minimal slipperiness factor min$(S_F)$ and a maximal slipperiness factor max$(S_F)$ and compute the slipperiness index $S_i$ according to equation 2 below. The minimal slipperiness factor min$(S_F)$ and a maximal slipperiness factor max$(S_F)$ may be defined, for example, based on empiric evaluation and/or experimentation of a plurality of surfaces of water pools 202.

$$S_i = \begin{cases} 0, \text{ not slippery} & \text{median}(W_C) > \max(S_F) \\ 1, \text{ slippery} & \text{median}(W_C) < \min(S_F) \\ -1, & \min(S_F) \leq \text{median}(W_C) \leq \max(S_F) \\ -2, & \sigma(W_C) > T_{\sigma(W)} \end{cases} \quad \text{Equation 2}$$

As seen in equation 2, in case the median work coefficient median$(W_C)$ is larger than the maximal slipperiness factor max$(S_F)$, the slipperiness evaluation engine 220 may assign the value "0" to the slipperiness index $S_i$ indicating that the floor surface of the water pool 202 is not slippery. In case the median work coefficient median$(W_C)$ is smaller than the minimal slipperiness factor min$(S_F)$, the slipperiness evaluation engine 220 may assign the value "1" to the slipperiness index $S_i$ indicating that the floor surface of the water pool 202 is slippery.

However, in case the median work coefficient median $(W_C)$ is larger (or equals) than the minimal slipperiness factor min$(S_F)$ and smaller (or equals) the maximal slipperiness factor max$(S_F)$, the slipperiness evaluation engine 220 may be unable to determine with sufficient probability whether the floor surface of the water pool 202 is slippery or not and may assign an arbitrary value to the slipperiness index $S_i$, for example, "−1" indicating that whether the floor surface of the water pool 202 is slippery or not is indecisive.

Moreover, in case a standard deviation ($\sigma$) of the plurality of work coefficients $W_C$ computed for the plurality of rotations scans does not exceed the predefined work deviation threshold $T_{\sigma(W)}$, the slipperiness evaluation engine 220 may assign an arbitrary value to the slipperiness index $S_i$, for example, "−2" indicating that the slipperiness index $S_i$ could not be computed due to the fact that $\sigma(W_C) > T_{\sigma(W)}$.

As shown at 114, the slipperiness evaluation engine 220 may initiate one or more actions according to the slipperiness index $S_i$ computed for the water pool 202 which may be used for one or more applications.

Optionally, the slipperiness evaluation engine 220 may initiate one or more of the actions in case the slipperiness index exceeds a certain threshold, for example, a threshold indicating a that a water pool floor surface is slippery.

The actions initiated by the slipperiness evaluation engine 220 may include informative actions and/or proactive procedures applied to control one or more pool related systems, platforms, devices and/or the like.

For example, the slipperiness evaluation engine 220 may transmit one or more notifications and/or alert messages comprising the slipperiness index $S_i$ and/or an indication that the floor surface of the water pool 202 is slippery or not. The notifications may be transmitted for example, to one or more maintenance and/or control personnel, service and/or the like who may evaluate possible reasons for the slipperiness conditions in the water pool 202 and take action(s) accordingly. In another example, the slipperiness evaluation engine 220 may transmit one or more notifications to one or more automated pool related systems, platforms, equipment and/or devices, for example, a cleaning system, a pool cleaning robot, a purification systems and/or the like which may initiate one or more water and/or pool treatment actions accordingly.

In another example, the slipperiness evaluation engine 220 may transmit one or more notifications to one or more of the automated pool related devices, for example, a pool cleaning robot deployed on the floor surface of the water pool 202 which may use the slipperiness index $S_i$ to compute, estimate and/or adjust its movement on the floor surface. For example, in case the floor surface is slippery, traction of the pool cleaning robot may be reduced and it may advance slower compared to not slippery floor surface on which the pool cleaning robot may have better traction and thus move faster.

In another example, assuming the slipperiness evaluation system 200 is integrated in one or more pool related systems, platforms, equipment and/or devices, for example, a pool cleaning robot deployed in the water pool 202 such that the slipperiness evaluation engine 220 is executed by the pool cleaning robot. In such case the slipperiness evaluation engine 220 may induce, operate, instruct and/or cause the pool cleaning robot to initiate and conduct one or more actions to treat the water and/or pool surface(s) of the water pool 202, for example, clean the floor surface, circulate the water through one or more filtering systems and/or devices, release one or more agents and/or chemicals to the water, and/or the like.

Figure 4:
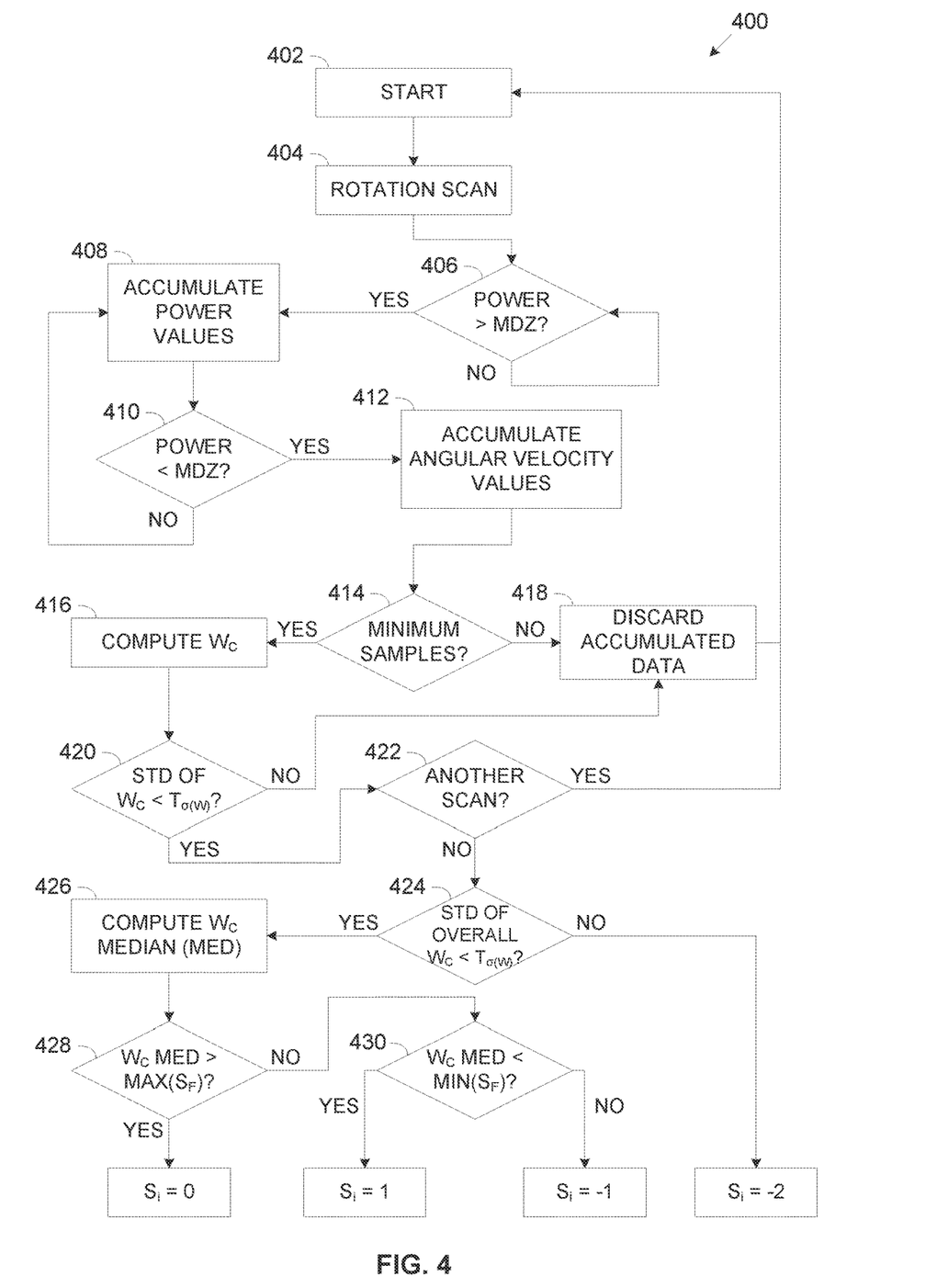
FIG. 4 is a flowchart of an exemplary process of evaluating slipperiness of a water pool floor surface based on multiple rotation scans of a pool equipment unit, according to some embodiments of the present invention.

Reference is now made to FIG. 4, which is a flowchart of an exemplary process of evaluating slipperiness of a water pool floor surface based on multiple rotation scans of a pool equipment unit, according to some embodiments of the present invention.

An exemplary flowchart 400 may be executed by a slipperiness evaluation engine such as the slipperiness evaluation engine 220 to compute a slipperiness index $S_i$ for a water pool such as the water pool 202 based on a plurality of rotation scans of a pool equipment unit such as the pool equipment unit 204 deployed on a floor surface of the water pool 202.

As seen at 402, the slipperiness evaluation engine 220 may start a session for computing the slipperiness index $S_i$ which may comprise a plurality of rotation scans, for example, 2, 3, 5 rotation scans and/or the like.

As seen in 404, the slipperiness evaluation engine 220 may initiate a (first) rotation scan. As described herein before, depending on its deployment, e.g. remote to the pool equipment unit 204 and/or integrated with the pool equipment unit 204, the slipperiness evaluation engine 220 may induce rotation of the pool equipment unit 204 by driving one or more power pulses to one or more electric motors of the pool equipment unit 204 operated, adapted and/or configured to rotate the pool equipment unit 204.

As seen in 406, 408, 410 and 412, during the rotation scan the slipperiness evaluation engine 220 may accumulate power values of the power pulse(s) driven to the electric motor(s) of the pool equipment unit 204 and angular velocity values of the pool equipment unit 204 as described herein before, for example, in FIG. 3. As seen in 406, the slipperiness evaluation engine 220 may branch to 408 and start accumulating power values after the level of the power pulse rises above the motor operation threshold (MDZ). Otherwise, the slipperiness evaluation engine 220 may branch back to 406 and wait for the level of the power pulse(s) to exceed the motor operation threshold (MDZ). As seen at 410, while the level of the power pulse exceeds (i.e., is above) the motor operation threshold (MDZ), the slipperiness evaluation engine 220 may remain at step 408 and continue accumulating power values until. After the level of the power pulse drops below the motor operation threshold (MDZ) and the motor(s) no longer actively rotates the pool equipment unit 204, the slipperiness evaluation engine 220 may branch to 412 and start accumulating angular velocity values until the pool equipment unit 204 stops rotating and comes to a stop. The slipperiness evaluation engine 220 may accumulate the power values and angular velocity values and store them in memory, for example, in respective buffers.

As seen in 414, in case there are sufficient samples, i.e., a minimal number of power values and angular velocity values is accumulated, the process 400 may branch to 416. However, in case the number of power values and angular velocity values does not meet the minimal number of samples, the process 400 may branch to 418.

As seen in 416, since there is a sufficient number of power values and angular velocity values, the slipperiness evaluation engine 220 may compute the work coefficients $W_C$. In contrast, as seen at 418, since there is an insufficient number of power values and angular velocity values, the slipperiness evaluation engine 220 may discard them, stop the current rotation scan and optionally branch back to step 404 to start another rotation scan.

As seen at 420, the slipperiness evaluation engine 220 may compute a standard deviation a (designated STD in the drawing) of the work coefficient $W_C$ and compare it to the predefined work deviation threshold $T_{\sigma(W)}$. In case $\sigma(W_C) < T_{\sigma(W)}$, the process 400 may proceed to 422. Otherwise, the process 400 may branch to 418 where the slipperiness evaluation engine 220 may discard the power values and angular velocity values accumulated during the current rotation scan, stop the scan and optionally branch back to step 404 to start another rotation scan.

As seen in 422, the slipperiness evaluation engine 220 may check whether an additional rotation scan should be initiated or is the current rotation scan the last one to be conducted during the current session. In case the current rotation scan is the last scan, the process 400 may branch to 424, otherwise the process 400 may branch to 404 to start another rotation scan.

As seen in 424, the slipperiness evaluation engine 220 may compute a standard deviation a of a plurality of work coefficients $W_C$ computed for the plurality of rotation scans and again compare the standard deviation a it to the predefined work deviation threshold $T_{\sigma(W)}$. In case $\sigma(W_C) < T_{\sigma(W)}$, the process 400 may proceed to 426. Otherwise, the slipperiness evaluation engine 220 may determine the rotation scans session encountered some abnormal conditions which prevented reliable, accurate, and/or meaningful slipperiness index $S_i$ and may assign the value "-2" to the slipperiness index $S_i$.

As seen in 426, the slipperiness evaluation engine 220 may compute a median (designated MED in the drawing) of the work coefficients $W_C$ computed for the plurality of rotation scans.

As seen in 428, in case the median of the work coefficients median($W_C$) is larger than the maximal slipperiness factor max($S_F$), the slipperiness evaluation engine 220 may assign the value "0" to the slipperiness index $S_i$ indicating that the floor surface of the water pool 202 is not slippery. Otherwise the process 400 may proceed to 430.

As seen in 430, in case the median work coefficient median($W_C$) is smaller than the minimal slipperiness factor min($S_F$), the slipperiness evaluation engine 220 may assign the value "1" to the slipperiness index $S_i$ indicating that the floor surface of the water pool 202 is slippery. However, in case the median work coefficient median($W_C$) is larger than (or equal) the minimal slipperiness factor min($S_F$) and smaller than (or equal) the maximal slipperiness factor max($S_F$), the slipperiness evaluation engine 220 may be unable to reliably determine whether the floor surface of the water pool 202 is slippery or not and may therefore assign the value "-1" to the slipperiness index $S_i$ indicating that whether the floor surface of the water pool 202 is slippery or not is indecisive.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms pool equipment unit, and electric motor are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of evaluating slipperiness of a floor surface of a water pool, comprising:
    using at least one processor to execute a computer program code for:
        inducing at least one rotation scan of a pool equipment unit by driving a power pulse to at least one electric motor configured to drive the pool equipment unit on a circular path, the pool equipment unit is deployed on the floor surface of the water pool and is at least partially submerged in water of the water pool;
        collecting power values of the power pulse while a level of the power pulse is above a motor operation threshold of the at least one electric motor;
        collecting values of angular velocity of the pool equipment unit measured starting after the power pulse drops below the motor operation threshold until the pool equipment unit stops traveling along the certain circular path;
        computing work energy consumed to drive the pool equipment unit along the certain circular path based on the collected power values and the collected angular velocity values;
        computing a slipperiness index of the floor surface based on the work energy; and
        initiating at least one action according to the slipperiness index.

2. The computer implemented method of claim 1, wherein the power pulse is defined based on an estimation of power required by the at least one electric motor to cause the pool equipment unit to complete a certain rotation movement during the at least one rotation scan.

3. The computer implemented method of claim 1, wherein the work energy is computed by dividing a sum of the collected power values by a sum of the collected angular velocity values.

4. The computer implemented method of claim 3, wherein the work energy is adjusted to include an absolute value of a quotient of the division.

5. The computer implemented method of claim 1, wherein the work energy is computed when there is a minimum number of collected power values and collected angular velocity values.

6. The computer implemented method of claim 1, wherein the work energy is adjusted based on at least one parameter of the water of the water pool, the at least one parameter is a member of a group comprising: viscosity, pH, temperature, chemical composition, and biological composition.

7. The computer implemented method of claim 1, wherein the work energy is adjusted based on at least one mechanical feature of the pool equipment unit.

8. The computer implemented method of claim 1, wherein the work energy is adjusted to compensate for at least one cable extending from the pool equipment unit in case of a wired pool equipment unit.

9. The computer implemented method of claim 1, wherein the work energy is adjusted based on at least one structural feature of the water pool.

10. The computer implemented method of claim 1, wherein the slipperiness index is computed when a standard deviation of the work energy does not exceed a work deviation threshold predefined empirically based on a plurality of past rotation scans.

11. The computer implemented method of claim 1, wherein the slipperiness index is expressed in a plurality of discrete values.

12. The computer implemented method of claim 1, further comprising computing the slipperiness index based on a median of the work energy computed based on power values and angular velocity values measured and collected in a plurality of rotation scans.

13. The computer implanted method of claim 1, wherein the at least one action is initiated in case the slipperiness index exceeds a certain threshold.

14. The method of claim 1, wherein the at least one action is a member of a group consisting of: transmitting at least one notification, inducing at least one water treatment operation, and inducing at least one pool treatment operation.

15. The computer implemented method of claim 1, wherein the at least one electric motor is configured to drive the pool equipment unit on the circular path by operating advancing means of the pool equipment unit.

16. The computer implemented method of claim 15, wherein the at least one electric motor comprises at least one servomotor.

17. The computer implemented method of claim 15, wherein the advancing means comprising at least two tracks arranged at two opposite sides of the pool equipment unit and rotated by at least one driving wheel spun by the at least one electric motor.

18. A system for evaluating slipperiness of a floor surface of a water pool, comprising:
a program store storing a code; and
at least one processor coupled to the program store, the at least one processor is configured to execute the code, the code comprising:
  code instructions to induce at least one rotation scan of a pool equipment unit by driving a power pulse to at least one electric motor configured to drive the pool equipment unit along a certain circular path, the pool equipment unit is deployed on the floor surface of the water pool and is at least partially submerged in water of the water pool;
  code instructions to accumulate power values of the power pulse while a level of the power pulse is above a motor operation threshold of the at least one electric motor;
  code instructions to accumulate values of angular velocity of the pool equipment unit measured starting after the power pulse drops below the motor operation threshold until the pool equipment unit stops rotating;
  code instructions to compute work energy consumed to drive the pool equipment unit along the certain circular path based on the collected power values and the collected angular velocity values;
  code instructions to compute a slipperiness index of the floor surface based on the work energy; and
  code instructions to initiate at least one action according to the slipperiness index.

* * * * *